E. B. KILIAN.
PLATE LIFTER.
APPLICATION FILED MAY 14, 1917.

1,341,371. Patented May 25, 1920.

WITNESSES
James F. Crown,
L. B. Middleton

INVENTOR
Ernst B. Kilian,
BY Richard B. Owen,
ATTORNEY

UNITED STATES PATENT OFFICE.

ERNST B. KILIAN, OF HIGHLAND FALLS, NEW YORK.

PLATE-LIFTER.

1,341,371.     Specification of Letters Patent.     Patented May 25, 1920.

Application filed May 14, 1917. Serial No. 168,497.

*To all whom it may concern:*

Be it known that I, ERNST B. KILIAN, a citizen of the United States, residing at Highland Falls, in the county of Orange and State of New York, have invented certain new and useful Improvements in Plate-Lifters, of which the following is a specification.

This invention relates to new and useful improvements in kitchen utensils and the principal object of the invention is to provide means for lifting and transporting hot plates, pie and cake pans and the like.

Another object of the invention is to make the device of spring material so the same tends to assume an open position and to provide means for holding it closed against this spring action.

A further object of the invention is to make the device of one piece of metal bent to form a circular body portion and having loops formed thereon to engage the plate, and also having parallel portions forming a handle part, these portions being provided with means for holding them together to hold the device on the plate.

Another object of the invention is to provide a device of this character, which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings, wherein like characters denote like or corresponding parts throughout the several views, and in which.

Figure 1:
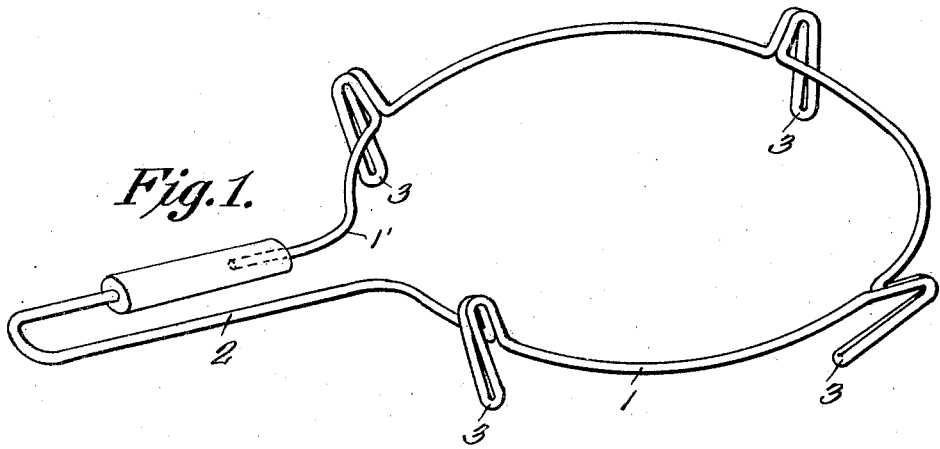
Figure 1 is a perspective view of the invention.
Figure 2:
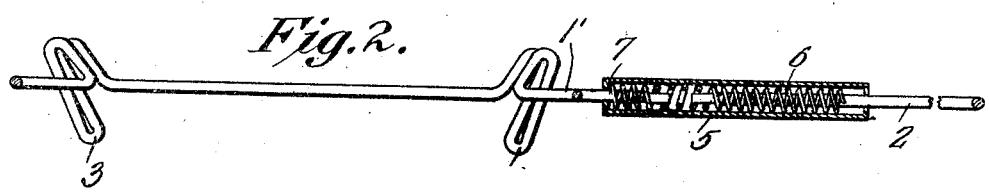
Fig. 2 is a central longitudinal sectional view.

In these figures 1 indicates the holding member of the device while 2 indicates the handle portion, this handle portion being provided with the means for holding the device in contact with the plate. The member 1 carries the hooks 3 for engaging the plate.

I prefer to make this device of a single piece of spring wire bent in the form of a circle to provide the member 1 and with its ends spaced apart and extended parallel with each other to form the handle 2. At suitable points on the circular part I form the hooks 3, by doubling the wire on itself and bending this doubled wire to form the hooks as shown. Four of these hooks are shown in the drawings, but any desired number of such hooks may be provided.

It will be noted that one terminal of the wire strand is relatively long, while the other is relatively short, and the long strand is bent upon itself and the extremity of said bent portion directed toward the short terminal, so that the terminals of the strand may thus be in alinement. The device is held closed by a sleeve 5 in which the longer or bent terminal of the wire strand is received and held by a spring 6 with its end 7 in engagement with the circular part 1' adjacent the point where said part connects with the parallel ends, thus holding the device closed. To open the device, the sleeve is pushed toward the free ends of the handle portion so as to move the end 7 of the sleeve away from the circular portion to permit this circular portion to spring open. The spring 6 is carried within the casing and has one end secured to the handle portion so that as the casing is moved forward the spring is compressed and when the casing is released the spring will cause it to assume its normal position and close the holder.

In operation, the sleeve 7 is pushed back so as to allow the device to open. It is then placed on a plate or other article to be lifted, and then closed by compressing the two parallel portions of the handle together, thus the plate is gripped by the circular part 1 with the hooks 3 coming under the plate so that the said plate may be lifted and carried without touching the same with the hand.

It is thought from the foregoing that the advantages and novel features of my invention will be readily apparent.

I desire it to be understood that I may make slight changes in the construction and in the combination and arrangement of the several parts, provided such changes fall within the scope of the appended claim.

I claim as my invention:

A plate lifter including a circular plate embracing portion, a plurality of loops formed therein to engage the edges of the plate, parallel terminals formed on said plate engaging portion one terminal being short, and the other being longer and bent upon itself and directed toward the short member, the extremities of said terminals being in alinement, a sleeve slidably mounted on the longer terminal and adapted to receive the other terminal therein, and a coiled spring in said sleeve urging the sleeve in a position to receive both terminals.

In testimony whereof I affix my signature in presence of two witnesses.

ERNST B. KILIAN.

Witnesses:
JOHN J. CHRISTOFF.
CLOYD O. HUMPHREY.